US011598211B2

(12) United States Patent
Redon

(10) Patent No.: US 11,598,211 B2
(45) Date of Patent: Mar. 7, 2023

(54) CYLINDER BORE SURFACE STRUCTURES FOR AN OPPOSED-PISTON ENGINE

(71) Applicant: ACHATES POWER, INC., San Diego, CA (US)

(72) Inventor: Fabien G. Redon, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 308 days.

(21) Appl. No.: 16/556,028

(22) Filed: Aug. 29, 2019

(65) Prior Publication Data

US 2020/0018166 A1 Jan. 16, 2020

Related U.S. Application Data

(63) Continuation of application No. PCT/US2018/022963, filed on Mar. 16, 2018.

(Continued)

(51) Int. Cl.
*F01B 7/14* (2006.01)
*F02F 1/00* (2006.01)
*F16C 29/02* (2006.01)

(52) U.S. Cl.
CPC ............. *F01B 7/14* (2013.01); *F02F 1/004* (2013.01); *F16C 29/02* (2013.01); *F16C 2223/00* (2013.01)

(58) Field of Classification Search
CPC ............ F01B 7/14; F02F 1/004; F16C 29/02; F16C 2223/00

(Continued)

(56) References Cited

U.S. PATENT DOCUMENTS 1,796,603 A * 3/1931 Junkers .................... F01M 9/06
123/196 R
6,553,957 B1 * 4/2003 Ishikawa .................. C23C 4/11
123/193.5

(Continued)

FOREIGN PATENT DOCUMENTS

EP 2050946 A1 4/2009
JP 3623330 B2 2/2005

(Continued)

OTHER PUBLICATIONS

International Preliminary Report on Patentability dated Oct. 3, 2019, for PCT application No. PCT/US2018/022963.

(Continued)

*Primary Examiner* — Logan M Kraft
*Assistant Examiner* — John D Bailey
(74) *Attorney, Agent, or Firm* — Terrance A. Meador

(57) ABSTRACT

A cylinder for an internal combustion opposed-piston engine includes a bore, either as part of the cylinder directly or of a liner. The bore has a surface for guiding a pair of pistons disposed for opposing movement in the cylinder. The cylinder bore has three zones of surface finishes: an inner zone extending between and including exhaust and intake ports, where only piston compression rings travel on the bore surface; two instances of an outer zone where only piston oil control rings travel on the bore surface; and two instances of a port zone where both types of rings travel on overlapping paths in the same bore surface portion. Each zone may have a particular surface finish that is tailored to specific requirements including oil control, ring wear, and scuff resistance relevant to the zone.

15 Claims, 5 Drawing Sheets

Related U.S. Application Data

(60) Provisional application No. 62/474,960, filed on Mar. 22, 2017.

(58) Field of Classification Search
USPC .................................................. 123/51 R
See application file for complete search history.

(56) References Cited

U.S. PATENT DOCUMENTS

| | | | | |
|---|---|---|---|---|
| 7,104,240 | B1* | 9/2006 | Vuk | F02F 1/20 |
| | | | | 123/193.2 |
| 8,485,147 | B2* | 7/2013 | Liu | F02B 75/282 |
| | | | | 123/51 B |
| 9,482,153 | B2 | 11/2016 | Bethel et al. | F02B 75/282 |
| 9,845,764 | B2 | 12/2017 | Koszewnik et al. | F02F 1/004 |
| 2004/0226402 | A1* | 11/2004 | Fuchs | F16J 10/04 |
| | | | | 74/828 |
| 2010/0326394 | A1* | 12/2010 | Hofbauer | F16J 9/206 |
| | | | | 123/196 R |
| 2012/0186561 | A1* | 7/2012 | Bethel | F02F 1/20 |
| | | | | 92/159 |
| 2013/0199503 | A1* | 8/2013 | Callahan | F16J 10/04 |
| | | | | 123/193.2 |
| 2014/0069272 | A1* | 3/2014 | Cryer | B24B 33/02 |
| | | | | 92/169.1 |
| 2015/0013649 | A1* | 1/2015 | Fuqua | F02B 23/0621 |
| | | | | 123/51 R |
| 2015/0122227 | A1* | 5/2015 | Abani | F02B 23/0663 |
| | | | | 123/51 R |
| 2015/0159582 | A1* | 6/2015 | Williams | F02F 1/108 |
| | | | | 123/193.2 |
| 2015/0240741 | A1* | 8/2015 | Scherer | C23C 4/08 |
| | | | | 123/193.2 |
| 2016/0025002 | A1* | 1/2016 | Ellis | F01L 5/20 |
| | | | | 123/51 R |
| 2016/0053710 | A1* | 2/2016 | Donahue | F02F 1/18 |
| | | | | 123/668 |
| 2016/0290277 | A1* | 10/2016 | Koszewnik | F02F 1/004 |
| 2017/0167430 | A1* | 6/2017 | Bettini Rabello | F02F 1/16 |
| 2018/0283309 | A1* | 10/2018 | Kamat | F02F 1/02 |
| 2019/0186407 | A1* | 6/2019 | Burns | F02F 1/004 |

FOREIGN PATENT DOCUMENTS

| | | |
|---|---|---|
| JP | 2008106697 A1 | 5/2008 |
| WO | WO-2018175255 A1 | 9/2018 |

OTHER PUBLICATIONS

ISR/Written Opinion, for PCT application No. PCT/US2018/022963, dated Jun. 26, 2018.

* cited by examiner

CYLINDER BORE SURFACE STRUCTURES FOR AN OPPOSED-PISTON ENGINE

PRIORITY

This application is a continuation of PCT application PCT/US2018/022963 filed Mar. 16, 2018, which claims priority to U.S. 62/474,960, filed Mar. 22, 2017.

RELATED APPLICATIONS

This application contains subject matter related to the subject matter of commonly-owned U.S. application Ser. No. 12/931,199, which was published as US 2012/0186561 A1 on Jul. 26, 2012, now U.S. Pat. No. 9,482,153, which issued Nov. 1, 2016, and commonly-owned U.S. application Ser. No. 14/675,340, which was published as US 2016/0290277 on Oct. 6, 2016, now U.S. Pat. No. 9,845,764, which issued Dec. 19, 2017.

FIELD

The field is opposed-piston internal combustion engines. More specifically this application relates to the bore surface structure of a ported cylinder and other components of an opposed-piston engine which influence the flow and retention of lubricating oil on the bore surface.

BACKGROUND

In a two-stroke cycle, opposed-piston internal combustion engine, there is at least one ported cylinder with a pair of pistons disposed for counter-moving operation in the cylinder bore. To-and-fro sliding motion of the pistons in the cylinder is guided by the bore surface. In one stroke, the pistons approach each other to form a combustion chamber between their end surfaces in an intermediate zone of the bore. In a following stroke, the pistons move apart in response to a combustion event. As the pistons slide together and apart, inner piston rings installed in the crowns of the pistons contact the bore surface to seal the combustion chamber and outer piston rings installed in the piston skirts, near outer ends of the pistons, scrape the bore surface to transport lubricating oil into and out of the cylinder. Piston movement spreads lubricating oil over and across the surface of the bore for the purpose of reducing friction between the bore surface on one hand and the rings and skirts of the pistons on the other.

During operation of the engine, lubricating oil is splashed from crankcases into the bore through the outer ends of a cylinder, toward intake and exhaust ports formed in the cylinder wall, near the outer ends. As the pistons move outwardly, away from the interior of the cylinder, the outer piston rings wipe excess splashed oil back out of the cylinder bore, through open ends of the cylinder. As the pistons move in the opposite direction, the outer piston rings pull oil inwardly toward the intake and exhaust ports. Lubricating oil remaining in the cylinder bore between the ports and the ends of the cylinder is transported by inner piston rings, over the ports, into the interior of the cylinder to an inner zone of the bore surface where the combustion chamber is formed. Oil is retained in the bore by means of a surface finish that imparts a texture in the bore surface. As oil is transported inwardly from the outer ends to the inner zone, the lubricating oil forms a film that is supported on the bore surface by the surface finish. The film lubricates the piston ring/cylinder bore interface during engine operation, thereby reducing friction and increasing the durability of the engine.

The characteristics of the oil film are influenced strongly by the surface finish. For example, the rougher the finish, the more oil is retained on the bore surface. An important tradeoff in managing the friction in piston/cylinder interfaces is to limit the amount of oil that enters the combustion process ("oil consumption") without significantly reducing the amount of oil available for lubrication of the inner rings. In a ported cylinder of an opposed-piston engine this tradeoff is intensified by the fact that lubricating oil must be transported across the exhaust and intake ports, and moving an excessive amount of oil across these features can adversely affect combustion and increase undesirable emissions.

Accordingly, it is desirable to assist the outer rings in minimizing the amount of oil retained in outer zones of the bore by providing a relatively smooth finish to the bore surface. However, too fine a finish, especially in the inner zone in which the inner rings traverse the ports and combustion occurs, may result in an oil film inadequate to manage friction as needed for enhanced efficiency and extended engine lifetime. Thus, the inner zone of the cylinder bore surface is provided with a rougher surface finish than the outer zones so as to support an oil film that is sufficient to minimize friction and scuffing of the inner piston rings, the piston skirts, and the bore surface in the inner zone.

SUMMARY

An inner zone of the cylinder bore surface that extends between and includes the intake and exhaust ports is provided with a rougher surface finish than the outer zones so as to support an oil film that is sufficient to minimize friction and scuffing of the inner piston rings, the piston skirts, and the bore surface in an interior region of the cylinder. In some aspects, exhaust and intake zones of the bore surface extending between outer edges of the exhaust and intake ports and respective outer zones are provided with surface finishes that accommodate overlapping movements of inner and outer rings during each cycle of engine operation.

In some implementations, a cylinder for an opposed-piston engine includes a bore surface with two or more zones with different surface finishes. An inner zone of the bore surface, which is traversed solely by inner piston rings that seal a compression chamber formed between opposed piston end surfaces, is provided with a first surface finish. An outer zone of the bore surface, which is traversed solely by outer piston rings that move oil to and from the bore surface, is provided with a second surface finish being of a roughness that is less than the first surface finish. Preferably, two oppositely-situated outer zones of the bore surface, which are traversed solely by outer piston rings of respective opposed pistons, are provided with respective second surface finishes, each being of a roughness that is less than the first surface finish. In some cases the second surface finishes are substantially equal. However, it may be the case that the second finishes are different in respective intake and exhaust regions of the bore surface.

Exhaust and intake zones of the bore surface located between respective ends of the inner zone and respective ones of the oppositely-situated outer zones are provided with third surface finishes which are tailored for specific lubrication objectives in high friction regions.

A component feature of an opposed-piston engine pertains to a cylinder with a bore surface for guiding movement of two opposed pistons, in which a first bore surface finish is provided in a first zone of the bore surface extending from an outer edge of an exhaust port to an outer edge of an intake port, a second bore surface finish is provided in a second zone of the bore surface in the vicinity of an exhaust end of the cylinder end, and a third bore surface finish is provided in a third zone of the bore surface between the outer edge of exhaust port and the second zone of the bore surface.

An optional feature of an inner bore surface zone with a first relatively rough surface finish includes additional bore surface finishing in each of two top ring reversal zones situated in the inner zone, wherein the top ring reversal zones are annular regions of the bore surface contacted by the inner rings of the pistons as the pistons reverse direction when passing through top center locations.

The opposed-piston engine may also include, in each cylinder, two or more fuel injector ports, near an intermediate portion of the cylinder the exhaust and intake ports, approximately where combustion occurs when the opposed-piston engine is in operation.

DETAILED DESCRIPTION

The component and engine embodiments described and illustrated herein are improvements and modifications of corresponding designs for two-stroke opposed-piston engines. Other aspects include methods for fabrication and use of pistons and cylinders of opposed-piston engines.

A two-stroke cycle engine is an internal combustion engine that completes an operating cycle with a single complete rotation of a crankshaft and two strokes of a piston connected to the crankshaft. One example of a two-stroke cycle engine is an opposed-piston engine in which two pistons are disposed in opposition in the bore of a cylinder. During engine operation, combustion takes place in a combustion chamber formed between the end surfaces of the two pistons when the pistons move through respective top center locations in the bore. The combustion chamber is defined and bounded by the end surfaces of the pistons and the annular portion of the bore surface between the end surfaces.

Figure 1:
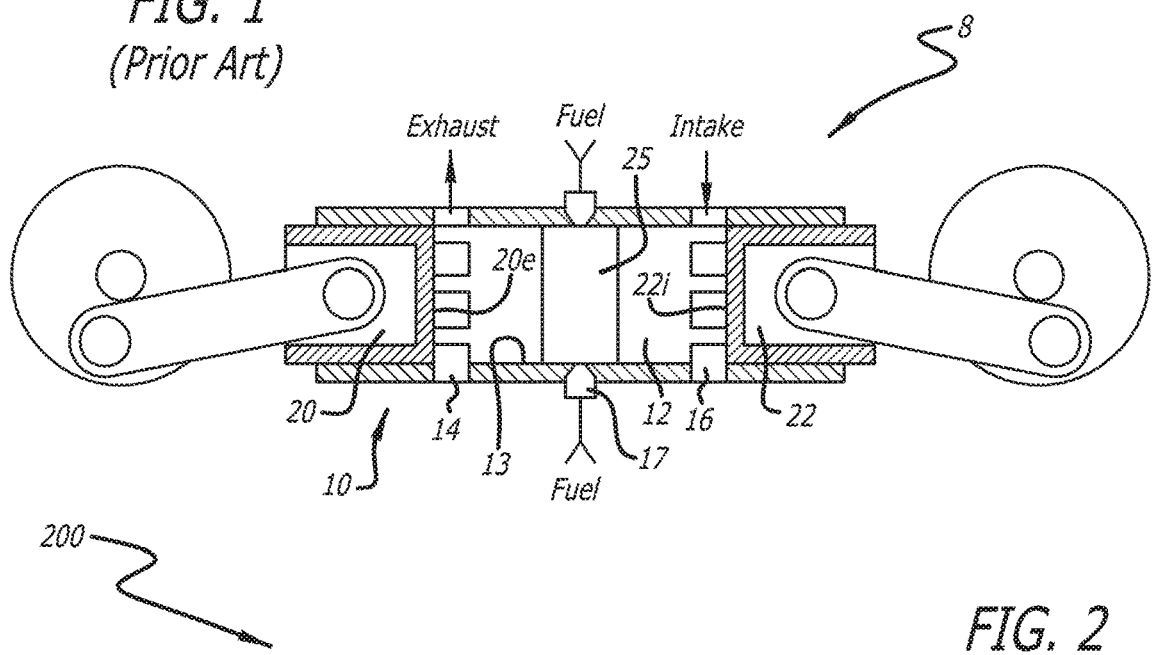
FIG. 1 shows a schematic drawing of a prior art opposed-piston engine.

With reference to FIG. 1, an opposed-piston engine 8 includes at least one cylinder 10 in which two pistons move in opposition. For example, the engine may have two cylinders, three cylinders, or four or more cylinders. In any event, the cylinders would be configured as represented by the cylinder 10. As described in related U.S. Pat. No. 8,485,147, the cylinder 10 includes a bore 12 with a cylindrical bore surface 13 and longitudinally displaced exhaust and intake ports 14, 16 that open through the bore surface 13. Each of the exhaust and intake ports includes one or more circumferential arrays of openings or perforations. In some other descriptions, each opening is referred to as a "port"; however, the construction of one or more circumferential arrays of such "ports" is no different than the port constructions shown in FIG. 1 and other figures herein. One or more injector ports 17 also open through the bore surface 13 of the cylinder 10. In this description an "injector port" comprises a hole through a sidewall of the cylinder in which a fuel injector nozzle is secured. Two counter-moving pistons 20 and 22 are disposed in the bore 12 with their end surfaces 20e and 22e in opposition to each other. In a compression stroke, the pistons slide toward respective top center (TC) locations in the bore where they are at their innermost positions in the cylinder. When combustion occurs, pressure forces the pistons to slide away from TO, toward respective associated ports in a power stroke. While moving from TO, the pistons keep their associated ports closed until they approach respective bottom center (BO) positions where they are at their outermost positions in the cylinder. An annular region 25 of the bore surface 13 surrounds a bore volume within which combustion occurs, that is to say, the portion of the bore volume between the piston ends when the pistons are at or near their respective TC locations. While the engine runs, the region 25 is subject to extreme strain from the temperatures and pressures of combustion. In some implementations, structural reinforcement and cooling measures are used around the region 25 to resist the effects of combustion.

Figure 2:
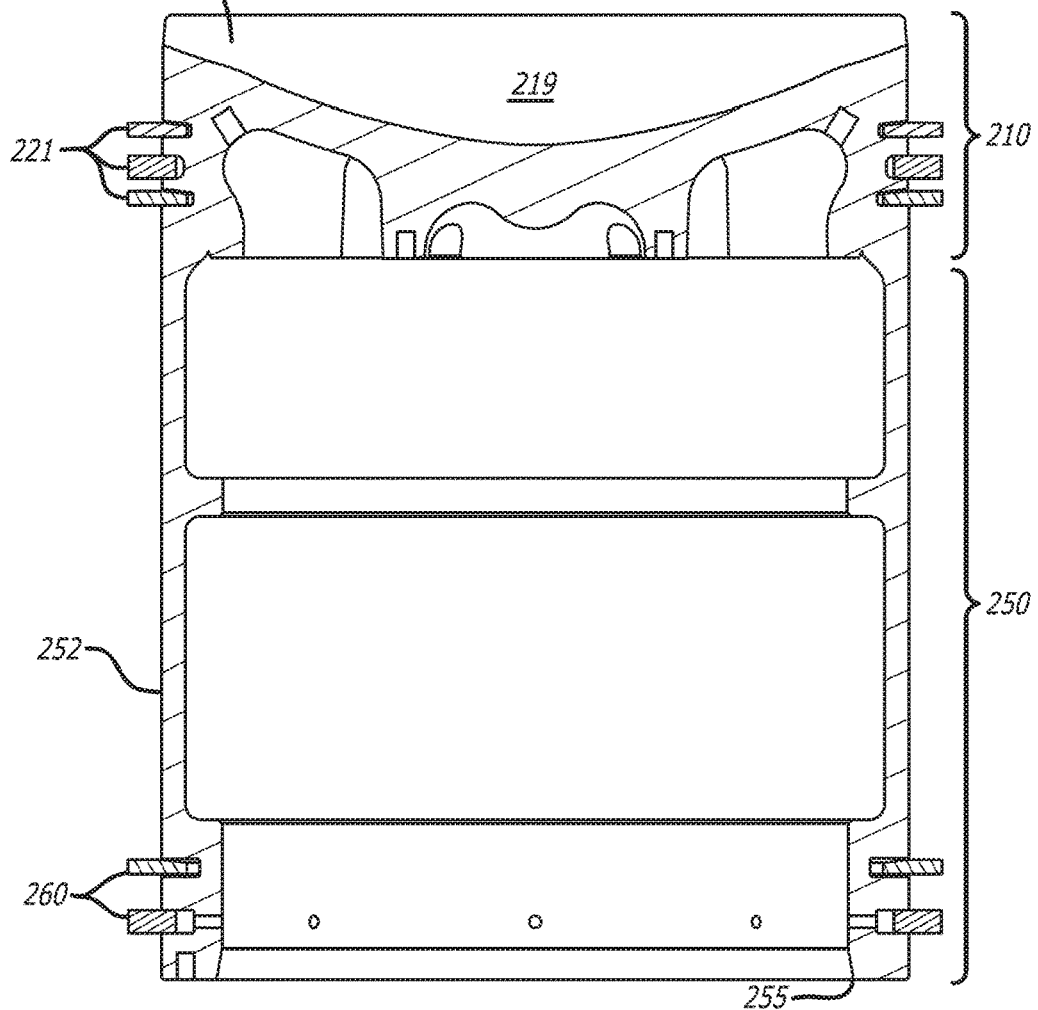
FIG. 2 is a cross-sectional view of a prior art piston of an opposed-piston engine, cut along a plane including the longitudinal axis of the piston, for use in an opposed-piston engine.

FIG. 2 is a cross-sectional view of a piston 200 of an opposed-piston engine, such as the engine 8 of FIG. 1, cut along a plane including the longitudinal axis of the piston. The piston 200 includes a crown 210 and a skirt 250. The crown 210 includes an end surface 212 and a bowl 219. The skirt 250 extends from beneath the crown 210 to an open end 255 of the piston 200. The lower portion of the skirt is referred to as a sidewall 252. The piston is equipped with two sets of rings. An inner set of two or more rings 221 is provided to seal the combustion chamber by contacting the cylinder bore surface. The inner rings 221 are installed in grooves formed in the crown 210 under the bowl 219, adjacent to the interface of the crown 210 and the skirt 250. These inner rings 221 are pressed tightly against the cylinder bore surface during engine operation in order to seal the combustion chamber and prevent the escape of gasses along the skirt. Frequently these rings are referred to as "compression rings" although they may also serve to transport lubricating oil across the ports into the inner zone of the bore surface when travelling from BC to TC. In the instance shown in FIG. 2, two compression rings sandwich a third ring, such as an oil spreader ring. The rings 221 are referred to as "inner rings" because they ride on the inner zone of the cylinder bore surface. An outer set of two or more rings 260 installed in an outer end of the skirt 250 is provided to scrape excess oil from an outer zone of the bore surface between one of the intake and exhaust ports and an open end of the cylinder. The rings 260 are seated in two or more grooves formed in the sidewall 252 near the open end 255 of the piston. The rings 260 are referred to as "outer rings" because they ride on an outer zone of the cylinder bore surface that adjoins an open end of the cylinder.

Figure 3:
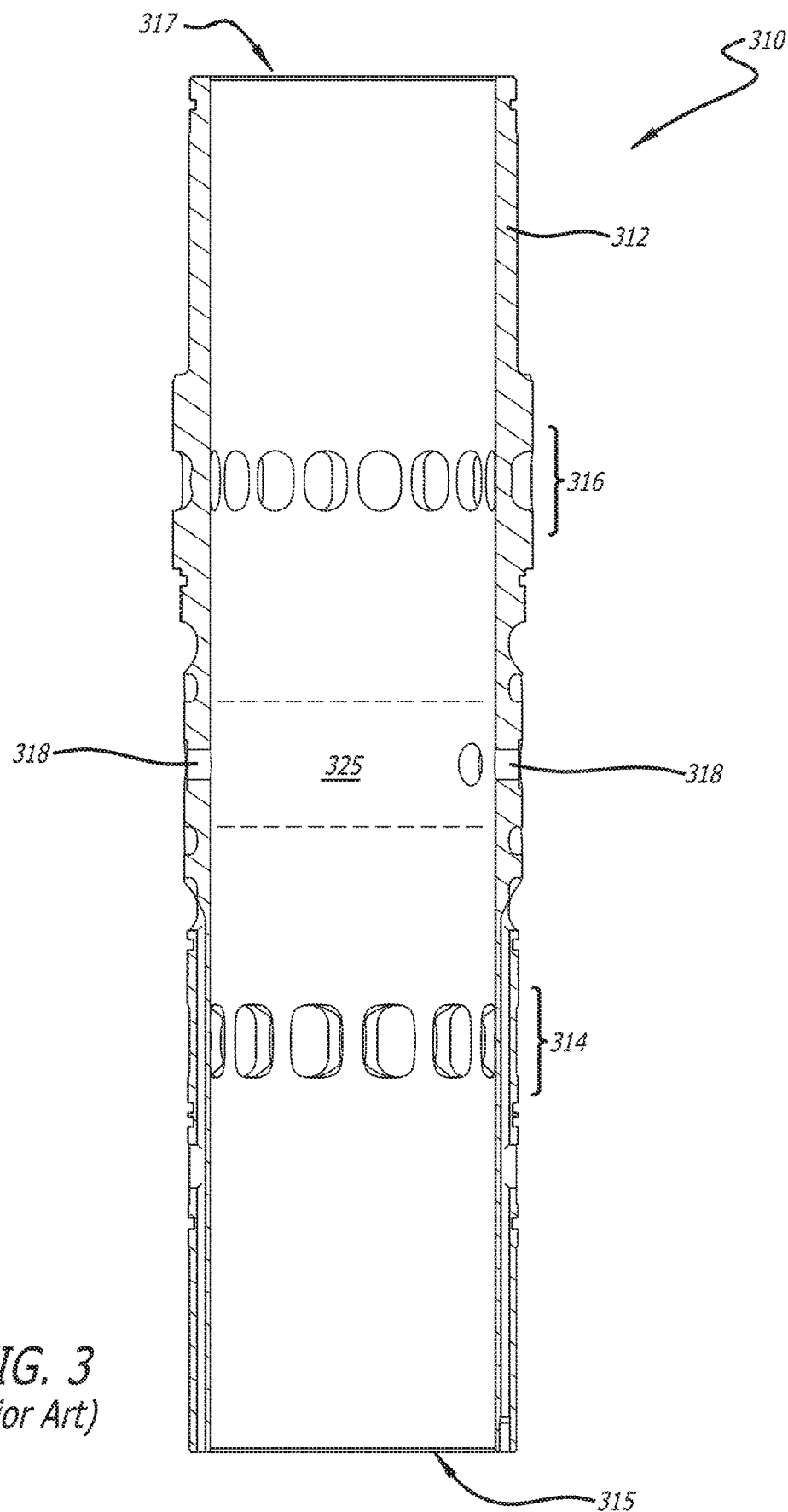
FIG. 3 is a side elevational view of a prior art cylinder for use in an opposed-piston engine.

For this disclosure, a cylinder in an opposed-piston engine may comprise a linerless boring, or a linerless formed space, in a cylinder block. Alternatively, the opposed-piston engine may comprise a liner (or sleeve) retained in a tunnel in a cylinder block. An example of the latter construction, which is not intended to limit the principles described and illustrated herein, is shown in FIG. 3—a side elevational view of a cylinder 310 for use in an opposed-piston engine such as the engine 8 of FIG. 1. The cylinder 310 includes a tubular liner 312 defining a sidewall and a bore. Exhaust and intake ports 314 and 316 respectively are formed in the cylinder through the sidewall, near respective ends 315 and 317 of the cylinder. The exhaust and intake ports 314 and 316 are separated longitudinally along the length of the cylinder 310. Each of these ends 315 and 317 is characterized by the gas transport activity that occurs in the nearest port. In this regard, the end 315 of the cylinder 310 closest to the exhaust port 314 is referred to as "the exhaust end" of the cylinder. Similarly, the end 317 of the cylinder 310 closest the intake port 316 is referred to as "the intake end" of the cylinder. Injector ports 318 for fuel injectors are formed in a portion of the sidewall of the cylinder between the ports 314 and 316. In this example, the fuel injector ports 318 are in or adjacent to a region 325 of the cylinder where a combustion chamber is formed between the end surfaces of a pair of opposed pistons.

Figure 4A:
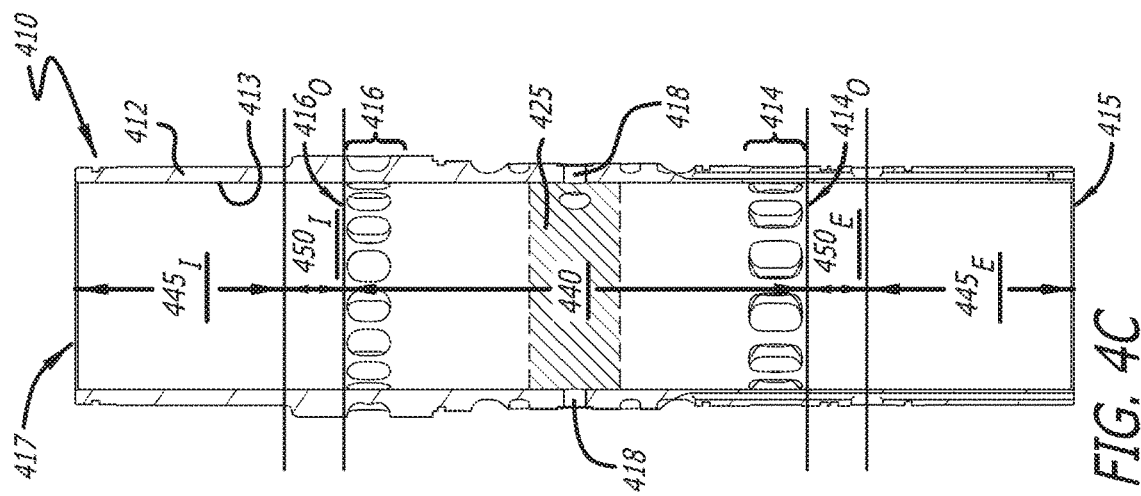
FIGS. 4A, 4B, and 4C are schematic, cross-sectional views of a cylinder and opposed pistons for use in an opposed-piston engine showing zones of a bore surface on which compression and oil control rings travel.
Figure 4B:
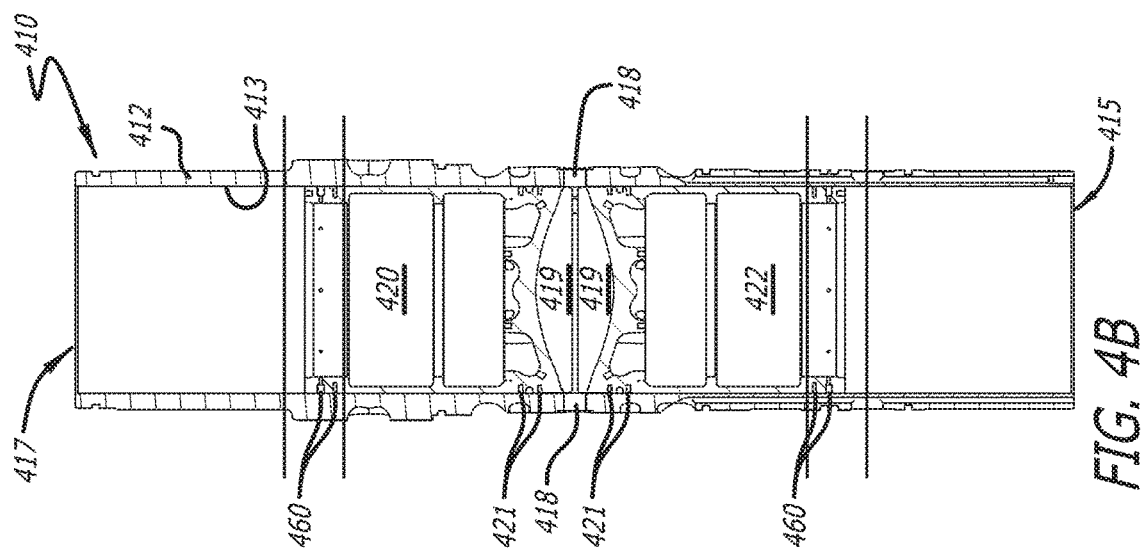
Figure 4C:
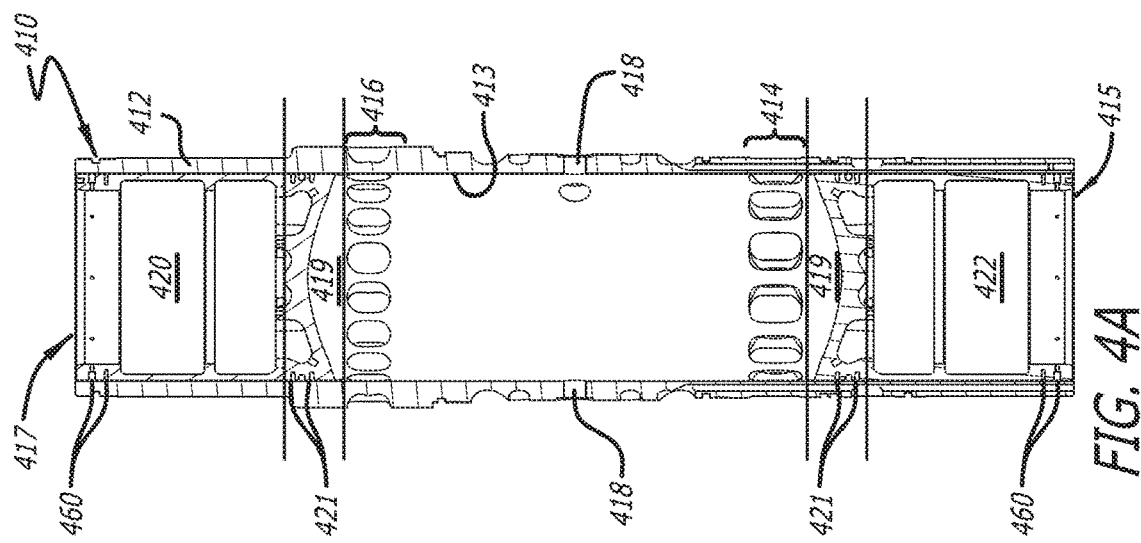

FIGS. 4A and 4B are schematic cross-sectional views of a cylinder and pistons as would be provided in an opposed-piston engine, such as the engine 8 of FIG. 1. FIG. 4C is a schematic cross-sectional view of the cylinder of FIGS. 4A and 4B, absent the pistons, showing different zones of inner and outer ring travel on the bore surface of the cylinder. The cylinder 410 may comprise a liner 412 with a bore surface 413, an exhaust port 414, an intake port 416, exhaust and intake ends 415 and 417, and two or more injector ports 418. The exhaust and intake ports 414 and 416 are longitudinally separated and located in opposite ends of an inner zone of the bore surface. Pistons 420 and 422 are disposed in opposition in the cylinder where their movements are guided by the bore surface 413. Each piston includes a set of inner piston rings 421 and outer piston rings 460 which are inserted in grooves when the pistons are installed in the cylinder's bore. The end surface of each piston includes a bowl 419 and other features shaped to form a combustion chamber in conjunction with the opposing end surface of the other piston.

In FIG. 4A, the pistons 420 and 422 are shown at respective BC locations in the cylinder 410 as would occur near the end of a power stroke. With the pistons in these locations, the ports 414 and 416 are entirely unobstructed and open. Exhaust gasses flow out of the cylinder through the exhaust port 414 and intake air flows into the cylinder through the open intake part 416. In FIG. 4B, the pistons 420 and 422 are shown in the vicinity of respective TC locations in the cylinder 410 near the end of a compression stroke, where the ports 414 and 416 are completely closed and fuel is injected into the cylinder through the injector ports 418.

The cross-sectional view of FIG. 4C shows the bore surface 413 of the cylinder 410 with the pistons removed. A number of distinct zones of the bore surface 413 ("bore surface zones") are designated. Each of these zones comprises an essentially annular portion of the bore surface 413. In each zone, the bore surface comprises a particular type or grade of surface finish (also called "bore finish"). A surface finish has a principal function of oil retention in the cylinder bore to maintain a desired oil film thickness in the interface between bore and piston surfaces. A common and well-understood measure of bore finish is called surface roughness (or, simply, "roughness"). Roughness may be expressed as a measure of surface contour variation, or as an oil retention capacity.

With reference to FIG. 4C, five distinct bore surface zones are defined: a first, inner, zone 440; two second, outer, zones $445_E$ and $445_i$; and two third zones denoted as an exhaust zone $450_E$ and an intake zone $450_i$. The first bore surface zone 440 includes the annular region 425 within which combustion occurs. During each cycle of opposed-piston engine operation only the inner piston rings 421 of the two pistons slide on the first bore surface zone as the pistons move toward and away from respective TC locations. As per FIGS. 4A, 4B, and 4C, since only the inner piston rings 421 slide on the bore surface segments of the exhaust and intake ports 414 and 416, these ports are included in the inner zone 440. Opposite ends $414_o$ and $416_o$ of the inner zone 440 are contiguous with, and are therefore defined by, outer edges of the exhaust and intake ports 414 and 416, respectively.

The inner zone 440 may have a surface finish distinct from the two outer zones $445_E$ and $445_i$. Only the inner piston rings 421 contact the inner bore surface zone 440 when the engine operates, and so the surface finish in the inner zone 440 can be optimized to reduce oil burning while minimizing friction. In this regard, the outer zones $445_E$ and $445_i$ have a surface finish that optimizes oil distribution and consumption, as only the outer piston rings 460 contact these zones when the engine is operating. In some instances, the outer zones $445_E$ and $445_f$ may have somewhat different surface finishes that are tailored to different conditions resulting from uniflow scavenging wherein average temperatures in the exhaust end 415 of the cylinder may be higher than in the intake end 417. The third zones $450_E$ and $450_i$ are those which both the outer piston rings and inner piston rings contact during engine operation. In these zones, the surface finish can be distinct from the surface finish in the first zone 440. In most embodiments, the roughness of the cylinder bore surface finish in the first zone 440 will be rougher than at of the outer zones $445_E$ and $445_i$.

As per FIGS. 4A, 4B, and 4C, during each cycle of opposed-piston engine operation only outer piston rings 460 slide on the two outermost portions of the cylinder bore surface that lead up to the ends of the cylinder and which make up the outer bore surface zones $445_E$ and $445_i$. During each cycle of opposed-piston engine operation, the third bore surface zones $450_E$ and $450_i$ are contacted by outer rings and inner rings sequentially, in overlapping to-and-fro movements of the inner and outer rings. Thus each of the third bore surface zones $450_E$ and $450_i$ is ridden four times by piston ring sets during each cycle of engine operation, while the other zones are only ridden twice.

TABLE I

|  | Zone | | | | |
| --- | --- | --- | --- | --- | --- |
| Embodiment | 440 | $445_E$ | $450_E$ | $445_I$ | $450_I$ |
| 1$^{st}$ Embodiment | $R_{440}$ | $R_{445E} < R_{440}$ | $R_{450E} > R_{440}$ | $R_{445I} < R_{440}$ | $R_{450I} > R_{440}$ |
| 2$^{nd}$ Embodiment | $R_{440}$ | $R_{445E} < R_{440}$ | $R_{450E} = R_{445E}$ | $R_{445I} < R_{440}$ | $R_{450I} = R_{445I}$ |
| 3$^{rd}$ Embodiment | $R_{440}$ | $R_{445E} < R_{440}$ | $R_{450E} = R_{440}$ | $R_{445I} < R_{440}$ | $R_{450I} = R_{440}$ |

With reference to FIGS. 4A, 4B, and 4C and also with reference to Table I, various illustrative embodiments of cylinder bore surface zone roughness constructions are described with respect to the bore surface mapping shown in FIG. 4C. Although the bore surface zone mapping is fundamental, the roughness relationships between the defined bore surface zones are not meant to be limited to just the embodiments shown in Table I. The reasonably skilled craftsman will realize that the relative magnitudes of roughness will be determined by performance requirements of any particular opposed-piston engine. In these embodiments, $R_{440}$ refers to the roughness of the inner zone 440, $R_{445E}$ refers to the roughness of the outer zone $445_E$ at the exhaust end 415 of the cylinder 410, $R_{450E}$ refers to the roughness of the exhaust zone $450_E$, $R_{445i}$ refers to the roughness of the outer zone $445_i$ at the intake end 417 of the cylinder 410, and $R_{450i}$ refers to the roughness of the intake zone $450_i$. The roughness values of the outer zones $445_i$ and $445_E$ and the third zones $450_i$ and $450_E$ may be adjusted to correspond to the end of the cylinder in which the zones lie (e.g., intake versus exhaust). Alternatively, the surface roughness of the zones can be applied similarly on both ends of the cylinder so that $R_{445i}$ and $R_{445E}$ are equivalent and $R_{4550i}$ and $R_{450E}$ are equivalent.

In the first embodiment, a value of roughness $R_{440}$ in the inner zone is selected to emphasize durability. The roughness values $R_{450E}$ and $R_{450i}$ are greater than $R_{440}$, while the values $R_{445E}$ and $R_{445i}$ are less than $R_{440}$. The bore surface roughness is lowest (i.e., is smoothest) at the extremities of the cylinder, where only the oil retention rings contact the bore surface, as is reflected in the values $R_{445E}$ and $R_{445i}$. Distribution of oil to the inner piston rings is the focus of the zones $450_E$ and $450_i$, and so the bore surface has the highest roughness values $R_{450E}$ and $R_{450i}$ here. Scuffing and seizing are concerns that are mitigated by adequate lubrication and oil retention, but that need to be weighed against burning oil that enters the combustion chamber by way of the ports. This results in the surface roughness of the cylinder bore in the center being a middle value, $R_{440}$, in this first embodiment.

The second embodiment listed in Table I is one in which the roughness values $R_{445E}$ and $R_{450E}$ are equal, or approximately the same, and similarly, $R_{445i}$ and $R_{450i}$ are approximately the same or equal. The roughness in the middle of the cylinder, $R_{440}$, is greater than $R_{445E}$, $R_{445i}$, $R_{450E}$, and $R_{450i}$. In this second embodiment, retaining enough oil on the surface of the cylinder bore to prevent scuffing and undue wear from the contact of inner piston rings on the bore surface is key. The roughness in the zones $450_E$ and $450_i$ is lower than that of the center zone 440, and is closer to, if not the same as, that in the area where only the piston outer rings contact the cylinder bore. In this embodiment $R_{450E}$ and $R_{450i}$ are approximately equal to $R_{445E}$ and $R_{445i}$, respectively, to lower the friction between the piston outer rings and the cylinder bore surface.

Table I lists a third embodiment in which the roughness values $R_{440}$, $R_{450E}$, and $R_{450i}$ are equal, or approximately the same, while the roughness at the extremities of the cylinder is lower, such that $R_{440}$ is greater than both $R_{445E}$ and $R_{445i}$. In this third embodiment, the bore surface is predominantly finished with a texture that serves to retain oil and increase durability particularly with respect to the outer rings of each piston.

Figure 5:
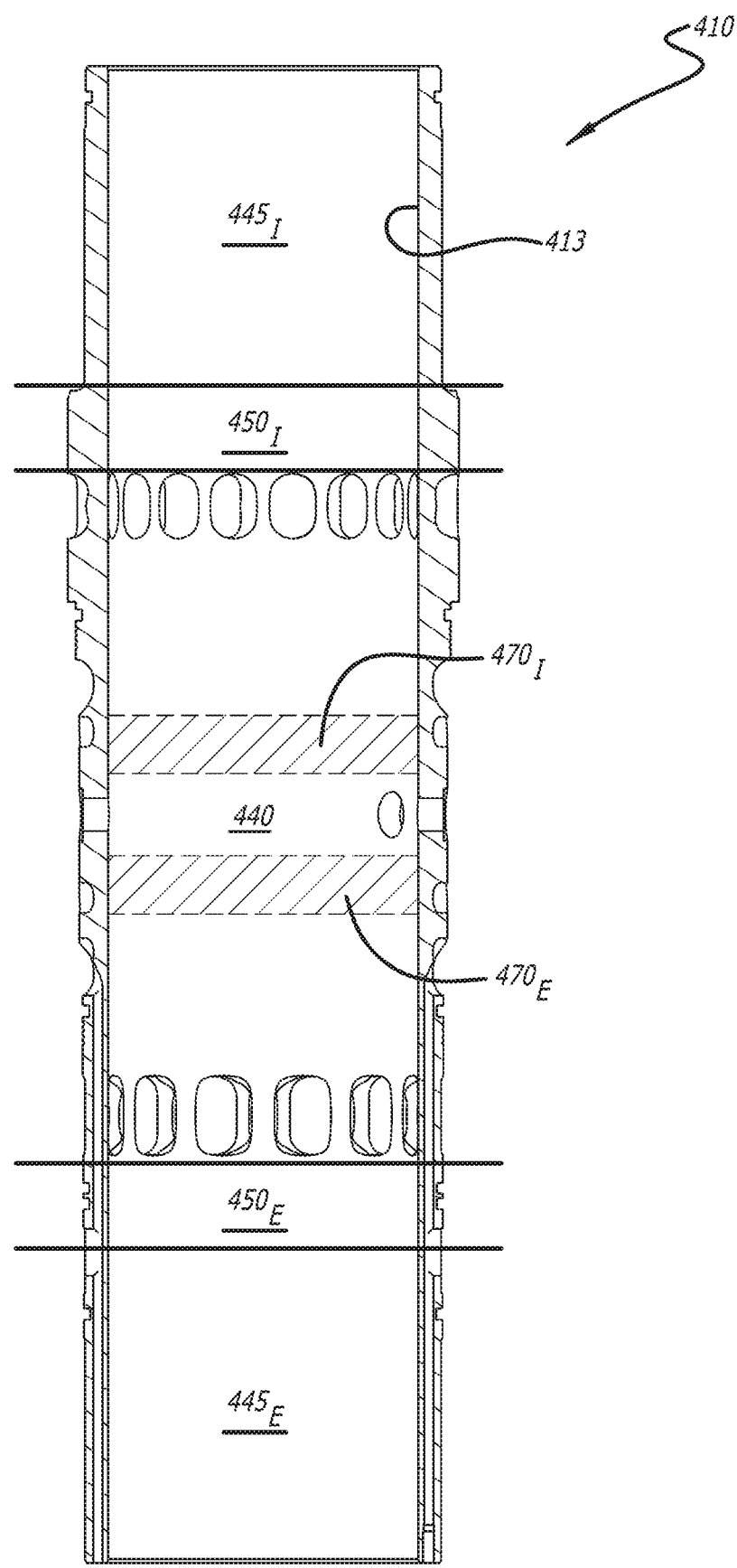
FIG. 5 is a schematic, cross-sectional view of a cylinder for use in an opposed-piston engine, showing a bore surface finish embodiment.

FIG. 5 is a cross-sectional view of the cylinder 410 with the pistons 420 and 422 removed to show three distinct zones of the bore surface 413. In addition, the figure shows an optional feature that includes additional bore surface finishing in each of two top ring reversal zones $470_E$ and $470_i$ situated in the inner zone 440, where annular regions of the bore surface are respectively contacted by the inner rings of the exhaust and intake pistons when passing through top center locations. In these zones $470_E$ and $470_i$, the pistons change direction and the reciprocating motion of the sliding velocity of the inner rings is low while the pressure bearing the inner rings against the bore surface is high, which can cause a boundary lubrication condition termed "dry lubrication" which is characterized by metal-on-metal contact with no liquid lubricant separating the solid bodies. Movement of the pistons on the bore surface under conditions of dry lubrication can damage the bore surface and/or the rings. Other undesirable effects of dry lubrication include increased friction and wear. In order to mitigate or eliminate these effects, it may be useful to provide a surface finish in the top ring reversal zones $470_E$ and $470_i$ with a roughness tailored to specific operating conditions of the engine. For example, heavy duty engines may require higher levels of roughness in the top ring reversal zones $470_E$ and $470_i$ than in the remainder of the inner bore surface zone 440. The roughness at the top ring reversal zones $470_E$ and $470_i$ can be similar to, or even the same as, the roughness in the zones $450_E$ and $450_i$, in which both types of piston rings contact the cylinder bore surface.

The types of surface finish that can be applied to different zones of a cylinder bore surface include various honed surfaces, as well as machined, laser textured (ablated), ion beam textured, or etched features. Surface finish may be selectively applied by certain steps in additive manufacturing. Surface finishes can be selected to reduce any of wear, friction losses, and lubricating oil consumption. A cylinder bore or cylinder liner bore can have two or more types of surface finish before an opposed-piston engine is put into service.

The surface finish applied to one or more zones in a cylinder bore before an engine is put into service can include plateau honing. Plateau honing of a cylinder bore surface creates valleys in the surface, while providing a flat surface above the valleys for the piston rings to travel across. The valleys in a plateau honed surface allow for oil retention and direction of oil flow.

Alternatively, or additionally, the surface finish applied to one or more zones in a cylinder bore prior to use can include a finish produced by using a slide honing tool with a reduced rotational speed. The honing angle in this helical honing pattern can be 140 degrees as a result of the reduced rotational speed of the honing tool. The honing angle used in conventional plateau honing, in comparison, can be around 45 degrees. In some implementations, one of the honing angles used to create a surface finish in one or more of the zones of a cylinder bore can range from 55 degrees to 65 degrees.

A cylinder bore surface can also be finished by coating with a material distinct from that of the cylinder block or cylinder liner. Methods that can be used to apply the coating material include plasma spraying, plasma-transferred wire arc applications, screen-printing, electroplating, anodization, and the like. The coated material applied to the cylinder bore can include a single material, a layered structure of two or more materials, or a composite of two or more materials. Two or more materials can be different or distinct even if the elements are the same when the structure of the materials are different. That is to say that two different phases or crystal structures of a metal, alloy, or oxide can be considered to be different materials when describing the material coated onto the cylinder bore surface. Materials that can be coated onto the cylinder bore include one or more of: diamond-like carbon (DLC); iron; iron oxide (e.g., wuestite or wustite, FeO); solid lubricant; polytetrafluoroethylene (PTFE); graphite; manganese phosphate; zinc phosphate; one or more high-temperature metal alloys; titanium oxide, metallic-loaded resin; an abradable powder coating; a polymer or resin matrix with embedded ceramic, metal, and/or graphite particles; and the like. The metal alloys can include alloys of titanium, nickel containing alloys, chromium containing alloys, or molybdenum containing alloys.

The coating applied to the cylinder bore can be honed to achieve a desired finish. A coating applied to the cylinder bore can be applied at an initial thickness of hundreds of microns (i.e., 200 or more micrometers), and the final coating thickness can be about 100 microns to about 150 microns. When the coatings are honed, they can be honed using diamond honing techniques. Alternatively, in the case of PTFE or polymer matrix coatings, the coating material can have a final thickness of about 10 microns to 50 microns. Materials coated onto a cylinder bore can have a bond strength of 30 MPa or greater, and the finished coating can include pores which can enhance the oil storage capacity of the finished surface. The pores can be formed by the material coating process (e.g., anodization, plasma spraying) or can be formed after the coated material is honed using laser, machining, or etching techniques.

Figure 6:
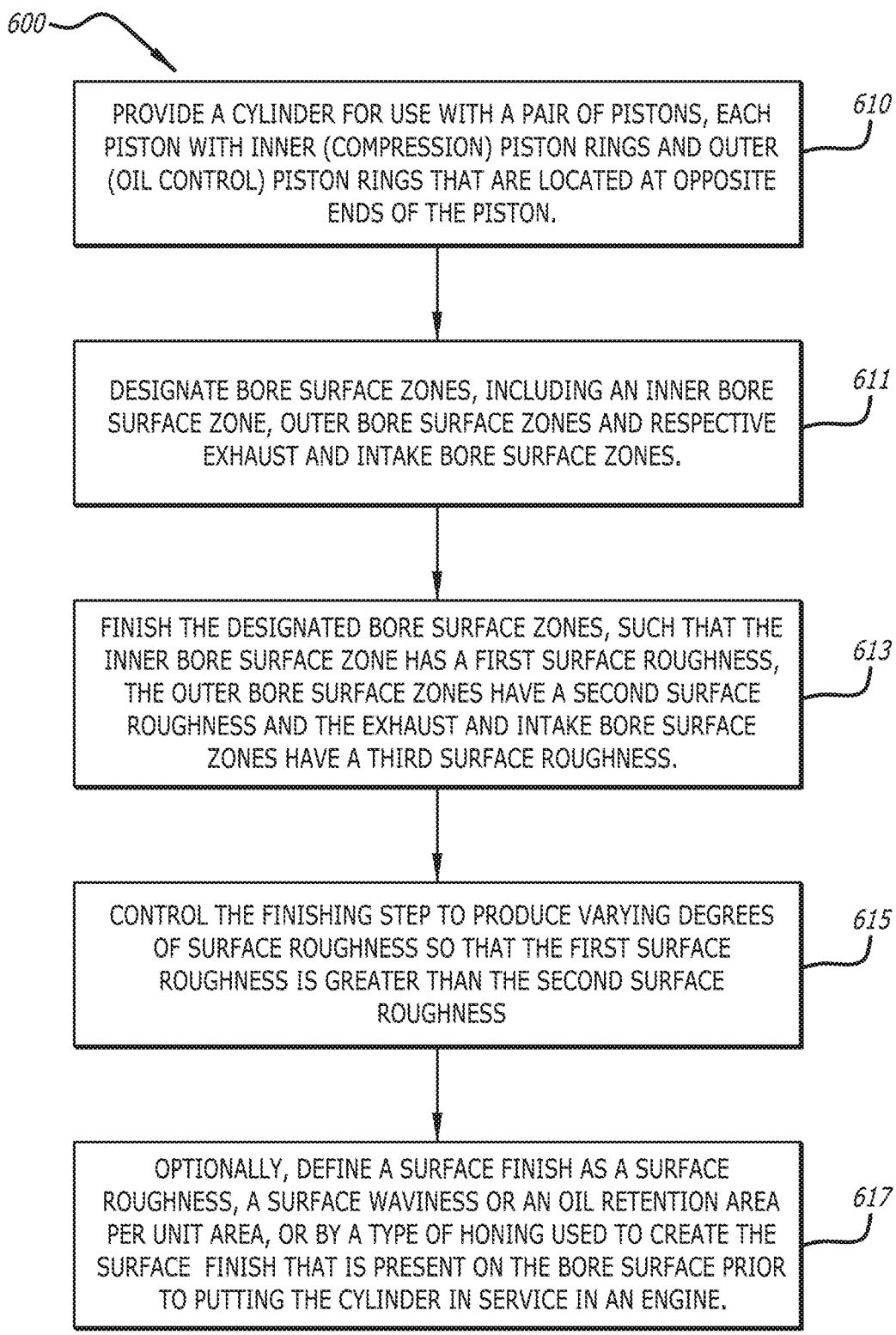
FIG. 6 shows a method for making a cylinder for use with an opposed-piston engine, as described herein.

FIG. 6 shows a method 600 for making a cylinder for use with an opposed-piston engine. The method begins at 610 by providing a cylinder for use with a pair of pistons, each piston having inner (compression) piston rings and outer (oil control) piston rings that are located at opposite ends of the piston (e.g., inner piston rings mounted to the piston crown portion and outer piston rings mounted to the skirt part, near the open end of the piston).

At 611, bore surface zones are designated. In this regard, an inner bore surface zone is designated on a bore surface of the piston. The inner bore surface zone includes first and second circumferential port regions concentrically aligned at spaced-apart locations on a longitudinal axis of the cylinder. Respective outer bore surface zones are designated near opposite ends of the cylinder, and respective exhaust and intake bore surface zones are designated, each located between a respective port region and a respective outer bore surface zone.

At 613, the designated bore surface zones are finished. In this regard, the bore surface portion in the designated inner bore surface zone is finished to a first surface roughness; the bore surface portions in the designated outer bore surface zones are finished to a second surface roughness; and, the bore surface portions in the designated exhaust and intake bore surface zones are finished to a third surface roughness.

At 615, the finishing step 613 is controlled so as to provide varying degrees of surface roughness, in which the first surface roughness is greater than the second surface roughness.

At 617, optionally, a surface finish can be defined by a surface roughness, a surface waviness, or an oil retention area per unit area, or by a type of honing used to create the surface finish that is present on the bore surface prior to putting the cylinder in service in an engine.

These skilled in the art will appreciate that the specific embodiments set forth in this specification are merely illustrative and that various modifications are possible and may be made therein without departing from the scope of the subject cylinder bore surface constructions for an opposed-piston engine.

The invention claimed is:

1. A cylinder for an internal combustion engine, comprising a bore surface, a first port means opening through the cylinder for transporting air into the cylinder, a second port means opening through the cylinder at a location longitudinally separated from the first port means for transporting exhaust gas out of the cylinder, a first bore surface zone extending between and including the first port means and the second port means, a second bore surface zone in the vicinity of a first end of the cylinder, and a third bore surface zone between an outer edge of the first port means and the second bore surface zone, in which the first bore surface zone comprises a first surface finish, the second bore surface zone comprises a second surface finish, and the third surface zone comprises a third surface finish.

2. An opposed-piston engine cylinder a bore surface for guiding movement of two opposed pistons, a first bore surface finish in a first zone of the bore surface which extends between and includes an intake port and an exhaust port, a second bore surface finish in a second zone of the bore surface in the vicinity of a first cylinder end, and a third bore surface finish in a third zone of the bore surface between an outer edge of the intake port and the second zone of the bore surface.

3. An opposed-piston engine, comprising a ported cylinder with a bore surface including outer zones, corresponding to an intake end and an exhaust end of the ported cylinder, separated by an inner zone which extends between and includes an exhaust port of the cylinder and an intake port of the cylinder, a first bore surface finish in the inner zone, a second bore surface finish in a first outer zone, and a third bore surface finish in a second outer zone, the first bore surface finish being of a higher roughness than both the second bore finish and the third bore finish.

4. The opposed-piston engine of claim 3, the second bore finish and the third bore finish each being of a substantially equal roughness.

5. The opposed-piston engine of claim 3, the ported cylinder further including the exhaust port being situated adjacent first end of the inner zone, and the bore surface further including an exhaust zone between the exhaust port and the first outer zone.

6. The opposed-piston engine of claim 5, the ported cylinder further including the intake port being situated adjacent a second end of the inner zone, and the bore surface further including an intake zone between the intake port and the second outer zone.

7. A liner for a cylinder of an opposed-piston engine, comprising
 a piston-guiding bore surface extending along a longitudinal axis: of the cylinder;
 an intake port region and an exhaust port region, each comprising a respective circumferentially-extending portion of the bore surface, the exhaust port region and intake port region being disposed in spaced-apart, coaxial alignment along the longitudinal axis;
 an inner bore surface zone including a longitudinally central portion of the bore surface which extends from the exhaust port region to the intake port region;
 one or more injection ports opening through the bore surface in the inner bore surface zone; and
 at least one outer bore surface zone near an end of the cylinder
 wherein the inner bore surface zone has a different surface finish than the outer bore surface zone.

8. An assembly for an opposed-piston engine, comprising:
a pair of pistons, each piston comprising a crown portion; a skirt portion with a first end where the skirt portion and crown portion and a second end longitudinally separated from the first end, the second end being an: open end of the piston; at least one compression ring in the crown portion; and, at least one oil control ring in the skirt portion near the open end; and
a cylinder, the cylinder comprising a bore surface for guiding the pair of pistons in opposing directions; an intake port and an exhaust port, each port comprising a generally circumferential array of port openings through the bore surface, the intake port and exhaust port separated longitudinally along a cylinder axis; and, a pair of injection ports opening through the bore surface in an intermediate portion of the cylinder between intake and exhaust ports; and
wherein the bore surface of the cylinder includes at least two zones separated longitudinally along the cylinder axis, each zone comprising a generally circumferential bore surface area contacted solely by a piston compression ring or a piston oil control ring during operation of the engine, and each zone being finished to a different oil retention capacity than the other zone.

9. The assembly of claim 8, a first zone of the at least two zones being contacted only by the compression rings of the pair of pistons and comprising a first surface finish with a first oil retention capacity, and a second zone of the at least two zones being contacted only by the at least one oil ring of a first piston of the pair of pistons and comprising a second surface finish having a second oil retention capacity, wherein the first oil retention capacity is greater than the second oil retention capacity.

10. The assembly of claim 8, a first zone of the at least two zones being contacted only by the compression rings of the pair of pistons comprising a first surface finish with a first surface roughness, and a second zone of the at least two zones being by contacted only by the one or more oil rings of a first piston of the pair of pistons and comprising a second surface finish having a second surface roughness, wherein the first surface roughness is greater than the second surface roughness.

11. The assembly of either of claims 9 and 10, the bore surface of the cylinder further including a third zone comprising a generally circumferential bore surface area contacted by a compression ring an oil control ring in overlapping movements during operation of the engine, and the third zone being finished to a different oil retention capacity than the first zone or the second zone.

12. The assembly of either of claims 9 and 10, the cylinder further including the exhaust port being situated adjacent an outer end of the first zone, and the bore surface further including an exhaust zone between the exhaust port and the second zone.

13. A method manufacturing a cylinder for an opposed-piston engine, comprising
providing a cylinder with a bore;
designating a first bore surface zone on a bore surface, the first bore surface zone including first and second circumferential port regions concentrically aligned at spaced-apart locations on a longitudinal axis of the cylinder;
designating respective second bore surface zones near opposite ends of the cylinder,
designating respective third bore surface zones, each located between a respective port region and a respective second bore surface zone; and,
finishing the bore surface in the designated first bore surface zone to a first surface roughness;
finishing the bore surface in the designated second bore surface zones to a second surface roughness; and,
finishing the bore surface in the designated third bore surface zones to a third surface roughness;
wherein, the first surface roughness is greater than the second surface roughness.

14. The method of claim 13, wherein finishing bore surface includes patterning areas of the cylinder bore surface with oil retaining slots.

15. The method of either claim 13 or 14, wherein finishing the bore surface comprises honing the bore to create a surface finish on the bore surface prior to putting the cylinder in service in an engine, in which the surface finish is defined by at least one of a surface roughness, a surface waviness, and an oil retention area per unit area.

* * * * *